US008369991B2

(12) United States Patent
Goswami et al.

(10) Patent No.: US 8,369,991 B2
(45) Date of Patent: Feb. 5, 2013

(54) HUMANOID FALL DIRECTION CHANGE AMONG MULTIPLE OBJECTS

(75) Inventors: Ambarish Goswami, Fremont, CA (US); Umashankar Nagarajan, Madurai (IN); Yoshiaki Sakagami, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 657 days.

(21) Appl. No.: 12/641,163

(22) Filed: Dec. 17, 2009

(65) Prior Publication Data

US 2010/0161126 A1 Jun. 24, 2010

Related U.S. Application Data

(63) Continuation-in-part of application No. 12/610,865, filed on Nov. 2, 2009, and a continuation-in-part of application No. 12/610,872, filed on Nov. 2, 2009.

(60) Provisional application No. 61/139,442, filed on Dec. 19, 2008, provisional application No. 61/242,726, filed on Sep. 15, 2009.

(51) Int. Cl.
*G05B 19/04* (2006.01)
*G05B 19/18* (2006.01)

(52) U.S. Cl. ......... 700/253; 700/245; 700/258; 700/260

(58) Field of Classification Search .................. None
See application file for complete search history.

(56) References Cited

U.S. PATENT DOCUMENTS

| | | | |
|---|---|---|---|
| 6,064,167 A | 5/2000 | Takenaka et al. |
| 6,902,015 B2 | 6/2005 | Furuta et al. |
| 6,915,230 B2 | 7/2005 | Kawai et al. |
| 6,969,965 B2 | 11/2005 | Takenaka et al. |
| 7,053,579 B2 | 5/2006 | Moridaira |
| 7,120,518 B2 | 10/2006 | Takenaka et al. |
| 2005/0055131 A1 | 3/2005 | Mikami et al. |
| 2005/0113973 A1 | 5/2005 | Endo et al. |
| 2005/0234593 A1 | 10/2005 | Goswami et al. |
| 2006/0243499 A1 | 11/2006 | Hosoda |
| 2007/0016329 A1 | 1/2007 | Herr et al. |
| 2008/0133053 A1 | 6/2008 | Pratt et al. |
| 2008/0249662 A1 | 10/2008 | Nakamura |

OTHER PUBLICATIONS

Abdallah, M., et al., "A Biomechanically Motivated Two-Phase Strategy for Biped Upright Balance Control," Proceedings of the 2005 IEEE, International Conference on Robotics and Automation, Barcelona, Spain, Apr. 2005, pp. 2008-2013.
Bullo, F., "Exponential Stabilization of Relative Equilibria for Mechanical Systems with Symmetries," Symposium on Mathematical Theory of Network and Systems, Jul. 1998, 4 pages.
Fujiwara, K. et al., "Ukemi: Falling Motion Control to Minimize Damage to Biped Humanoid Robot," Proceedings of the 2002 IEEE/RSJ International Conference on Intelligent Robots and Systems, EPFL, Oct. 2002, pp. 2521-2526, Lausanne, Switzerland.
Fujiwara, K. et al., "An Optimal Planning of Falling Motions of a Humanoid Robot," Proceedings of the 2007 IEE/RSJ International Conference on Intelligent Robots and Systems, Oct. 29-Nov. 2, 2007, pp. 456-462, San Diego, California, United States.

(Continued)

*Primary Examiner* — Khoi Tran
*Assistant Examiner* — Bhavesh V Amin
(74) *Attorney, Agent, or Firm* — Fenwick & West LLP; Mark Duell

(57) ABSTRACT

A system and method is disclosed for controlling a robot having at least two legs, the robot falling down from an upright posture and the robot located near a plurality of surrounding objects. A plurality of predicted fall directions of the robot are determined, where each predicted fall direction is associated with a foot placement strategy, such as taking a step, for avoiding the surrounding objects. The degree to which each predicted fall direction avoids the surrounding objects is determined. A best strategy is selected from the various foot placement strategies based on the degree to which the associated fall direction avoids the surrounding objects. The robot is controlled to implement this best strategy.

18 Claims, 13 Drawing Sheets

OTHER PUBLICATIONS

Kajita, S. et al., "Resolved Momentum Control: Humanoid Motion Planning based on the Linear and Angular Momentum," Proceedings of the 2003 IEEE/RSJ, International Conference on Intelligent Robots and Systems, Oct. 2003, pp. 1644-1650.

Kajita, S. et al., "Study of Dynamic Biped Locomotion on Rugged Terrain," Proceedings of the 1991 IEEE International Conference on Robotics and Automation, Apr. 1991, pp. 1405-1411.

Kajita, S. et al., "The 3D Linear Inverted Pendulum Mode: A simple modeling for a biped walking pattern generation," Proceedings of the 2001 IEEE/RSJ, International Conference on Intelligent Robots and Systems, Oct. 29-Nov. 3, 2001, pp. 239-246.

Komura, T. et al., "A Feedback Controller for Biped Humanoids that Can Counteract Large Perturbations During Gait," Proceedings of the 2005 IEEE International Conference on Robotics and Automation, Apr. 2005, pp. 1989-1995.

Komura, T. et al., "Animating Reactive Motions for Biped Locomotion," VRST 04, Nov. 10-12, 2004, 9 pages.

Komura, T. et al., "Simulating Pathological Gait Using the Enhanced Linear Inverted Pendulum Model," IEEE Transaction on Biomedical Engineering, Sep. 2005, pp. 1502-1513, vol. 52, No. 9.

Lee, S. et al., "Reaction Mass Pendulum (RMP): An Explicit Model for Centroidal Angular Momentum of Humanoid Robots," 2007 IEEE International Conference on Robotics and Automation, Apr. 10-14, 2007, pp. 4667-4672, Rome, Italy.

Mayer, N. et al., "Balanced Walking and Rapid Movements in a Biped Robot by Using a Symmetric Rotor and a Brake," 2006, 6 pages.

Park, J. H. et al., "Biped Robot Walking Using Gravity-Compensated Inverted Pendulum Mode and Computed Torque Control," Proceedings of the 1998 IEEE International Conference on Robotics & Automation, May 1998, pp. 3528-3533.

PCT International Search Report and Written Opinion, PCT Application No. PCT/US2007/085795, Jun. 19, 2008, 6 pages.

PCT International Search Report and Written Opinion, PCT Application No. PCT/US2008/083935, Jan. 28, 2009, 6 pages.

PCT International Search Report and Written Opinion, PCT Application No. PCT/US2009/067932, Feb. 4, 2010, 6 pages.

PCT International Search Report and Written Opinion, PCT Application No. PCT/US2009/068315, Feb. 5, 2010, 6 pages.

PCT International Search Report and Written Opinion, PCT Application No. PCT/US2009/067933, Mar. 2, 2010, 7 pages.

Pratt, J. et al., "Capture Point: A Step Toward Humanoid Push Recovery," Humanoids 2006, Dec. 2-4, 2006, 8 pages, Genoa, Italy.

Pratt, J. et al., "Velocity-Based Stability Margins for Fast Bipedal Walking," Fast Motions in Biomechanics and Robotics, 2006, Chapter 21, pp. 1-27, Springer Berlin, Heidelberg, Germany.

Rebula, J. et al., "Learning Capture Points for Humanoid Push Recovery," Proceedings of the 2007 IEEE-RAS International Conference on Humanoid Robots, Nov. 29-Dec. 1, 2006, 8 pages, Pittsburgh, Pennsylvania, USA.

Renner, R. et al., "Instability Detection and Fall Avoidance for a Humanoid Using Attitude Sensors and Reflexes," Proceedings of the 2006 IEEE/RSJ International Conference on Intelligent Robots and Systems, Oct. 9-15, 2006, pp. 2967-2973, Beijing, China.

Yamakita, M., et al., "Virtual Coupling Control for Dynamic Bipedal Walking," IEEE International Conference on Intelligent Robots and Systems, 2001, p. 233-238, vol. 1.

Yun, S. et al., "Safe Fall: Humanoid Robot Fall Direction Change Through Intelligent Stepping and Inertia Shaping," ICRA 2009, 7 pages, Kobe, Japan.

HUMANOID FALL DIRECTION CHANGE AMONG MULTIPLE OBJECTS

CROSS-REFERENCE TO RELATED APPLICATIONS

This application claims the benefit of U.S. Provisional Application No. 61/139,442, filed Dec. 19, 2008, which is incorporated by reference in its entirety. This application also claims the benefit of U.S. Provisional Application No. 61/242,726, filed Sep. 15, 2009, which is incorporated by reference in its entirety.

This application is a continuation-in-part of co-pending U.S. application Ser. No. 12/610,865, filed Nov. 2, 2009, entitled "Intelligent Stepping For Humanoid Fall Direction Change," which is incorporated by reference in its entirety. This application is also a continuation-in-part of co-pending U.S. application Ser. No. 12/610,872, filed Nov. 2, 2009, entitled "Inertia Shaping For Humanoid Fall Direction Change," which is incorporated by reference in its entirety.

This application is related to co-pending U.S. application Ser. No. 11/946,702, filed Nov. 28, 2007, entitled "Determination of Foot Placement for Humanoid Push Recovery," which is incorporated by reference in its entirety.

BACKGROUND

1. Field of the Invention

The present invention relates to controlling the motion of a legged robot while falling.

2. Description of Background Art

A humanoid robot falling from an upright (e.g., standing or walking) posture can cause damage to objects in its surroundings. There may be multiple objects in the surroundings of the robot. A humanoid robot fall may be caused due to unexpected or excessive external forces, unusual or unknown slipperiness, or the slope or profile of the ground. The fall may involve the robot slipping, tripping, or toppling. When the disturbances that threaten balance are larger than what the robot's balance controller can handle, the robot falls. Regardless of the substantial progress in humanoid robot balance control strategies, the possibility of a fall, however remote, remains real, even unavoidable. What is needed are techniques for reducing the damage to multiple objects in the surroundings of a humanoid robot when the robot falls.

SUMMARY OF THE INVENTION

Embodiments of the invention provide techniques for controlling a robot having at least two legs, the robot falling down from an upright posture and the robot located near a plurality of surrounding objects. A plurality of predicted fall directions of the robot are determined, where each predicted fall direction is associated with a foot placement strategy, such as taking a step, for avoiding the surrounding objects. The degree to which each predicted fall direction avoids the surrounding objects is determined. A best strategy is selected from the various foot placement strategies based on the degree to which the associated fall direction avoids the surrounding objects. The robot is controlled to implement this best strategy.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1A:
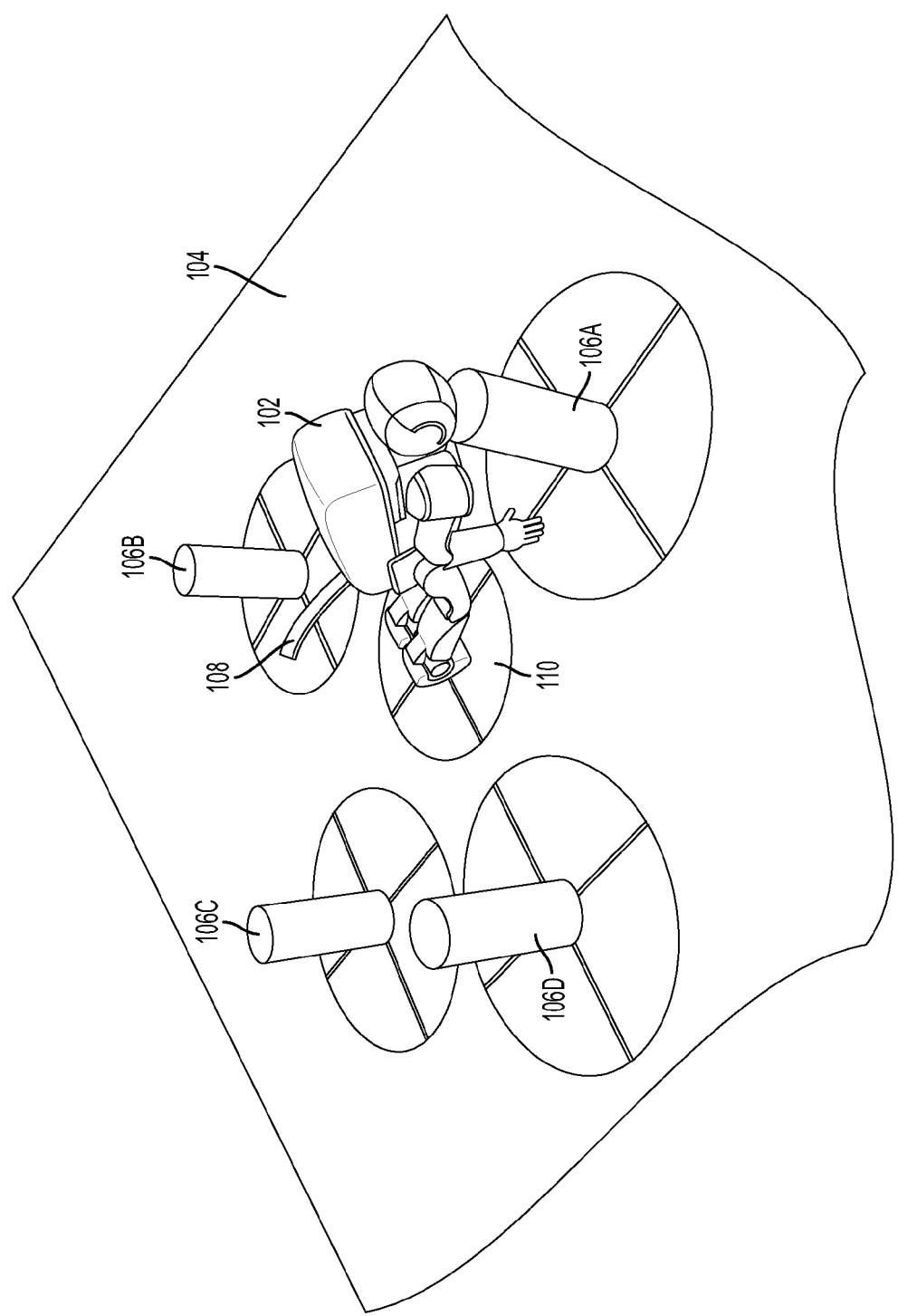
FIG. 1A illustrates a humanoid robot that has fallen forward into a surrounding object, in one embodiment.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1A illustrates a humanoid robot 102 that has fallen forward into surrounding object 106A, in one embodiment. The robot 102 was initially standing or walking upright on the surface 104 at location 110. The robot 102 may have fallen because it was pushed toward surrounding object 106A or because it tripped in the direction of surrounding object 106A, for example. In FIG. 1A, the fall controller of the robot 102 is not active and the robot does not take action to avoid falling into surrounding object 106A. Surrounding object 106A may be valuable object that may be damaged by the falling robot.

Figure 1B:
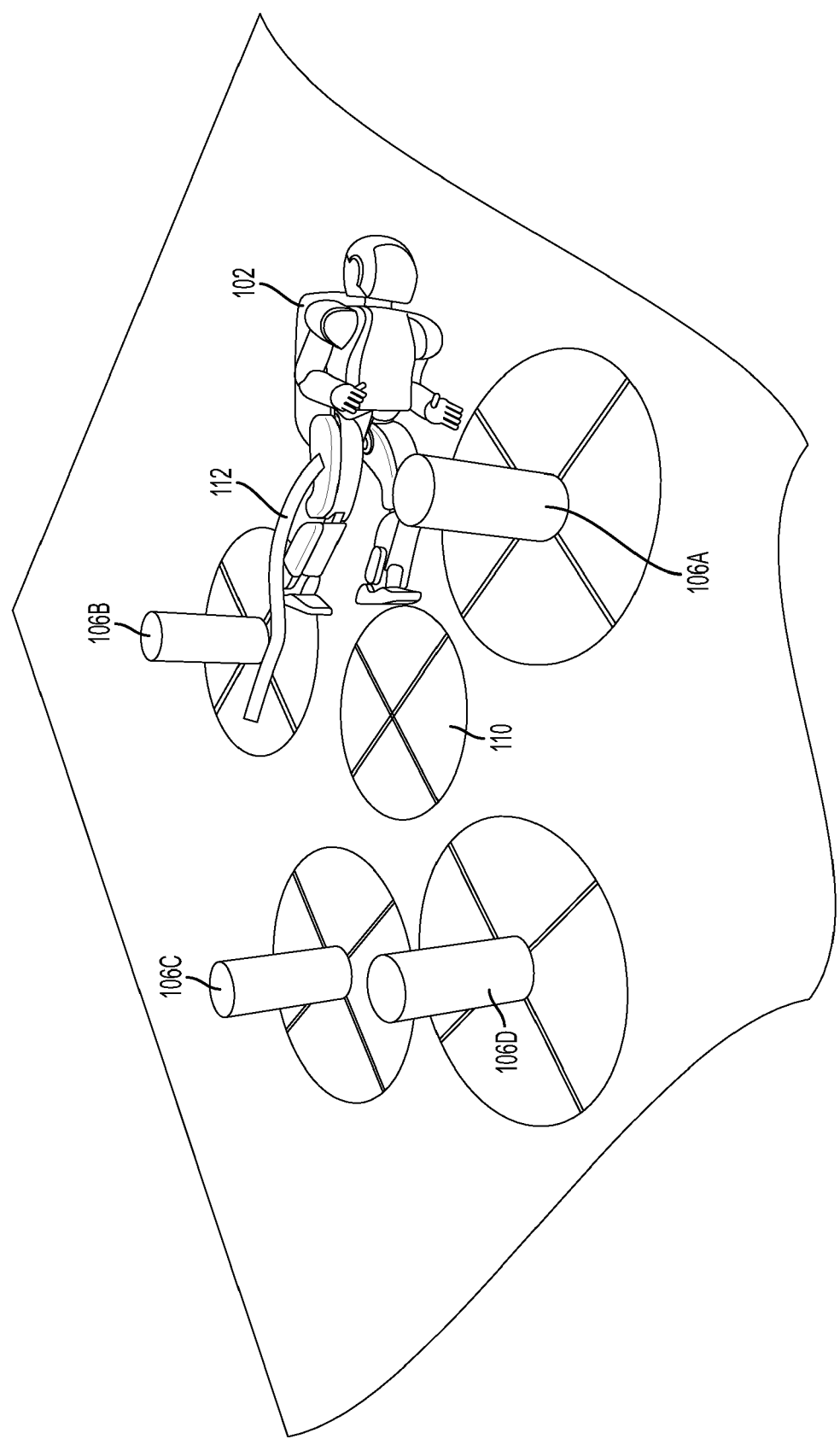
FIG. 1B illustrates a humanoid robot that has avoided falling into surrounding objects by using a fall controller, in one embodiment.

FIG. 1B illustrates a humanoid robot 102 that has avoided falling into surrounding objects 106 by using a fall controller, in one embodiment. The robot 102 in FIG. 1B was initially falling in the same direction as the robot in FIG. 1A. However, the fall controller of the robot caused the robot to change its direction of fall and avoid falling on any of objects 106A, 106B, 106C, or 106D. The modified fall trajectory as a result of the fall controller is shown as 112. The fall controller can cause the robot to take a step or to make other motions to change its direction of fall, as discussed further below.

Figure 2:
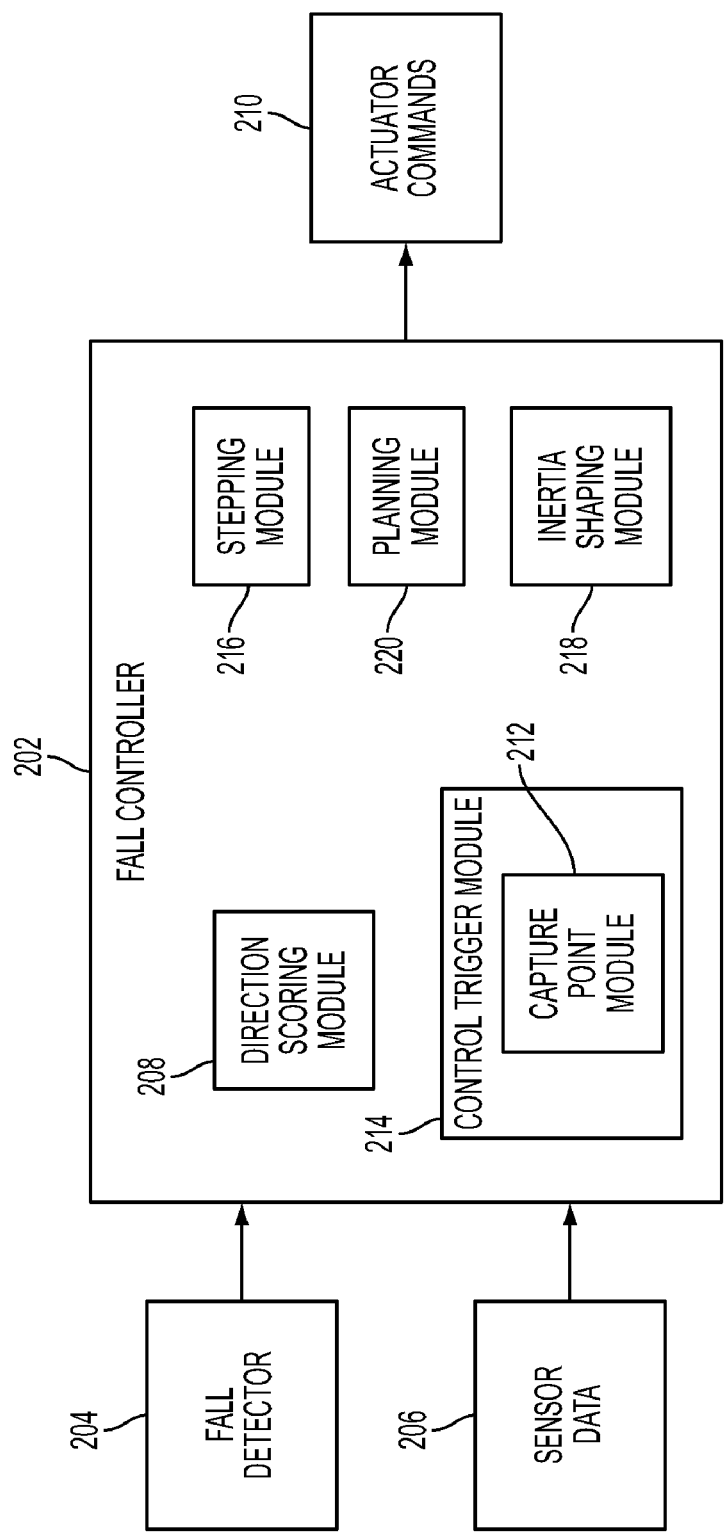
FIG. 2 is a block diagram illustrating a fall controller for controlling a robot during a fall, in one embodiment.

FIG. 2 is a block diagram illustrating a fall controller 202 for controlling a robot 102 during a fall, in one embodiment. The fall controller 202 enables the robot to change the direction of fall to avoid hitting nearby objects or people. The fall controller 202 includes a control trigger module 214, a capture point module 212, a direction scoring module 208, a stepping module 216, a planning module 220, and an inertia shaping module 218. These modules are discussed further below. The fall controller 202 receives input from a fall detector 204 and from sensor data 206. The fall detector 204 indicates to the fall controller 402 that the robot is no longer able to maintain its balance and is about to fall, in one embodiment. This indication is also referred to as a fall trigger. The sensor data 206 may be generated from sensors on the robot which provide information about the current configuration of the robot (e.g., joint angles and velocities) and information about the robot's surroundings (e.g., location of surrounding objects). The fall controller issues actuator commands 210 to control the actuators in the robot. The actuators can cause the robot to take a step or make other movements.

The fall controller 202 exploits the fact that regardless of its complex motion, a falling robot can topple only about an edge or a vertex of its support base, the support base being the convex hull of the contact points between the robot feet and the ground. The fall controller changes the robot's support base geometry by modifying the position and orientation of this leading tipping edge. This profoundly influences the robot's fall behavior, guiding the robot away from surrounding objects 106 and toward free areas. The support base geometry is modified through the lifting of a foot or a stepping action, and the specific parameters of these actions are selected using a brute-force process, in one embodiment. Additional improvements are achieved using inertia shaping techniques.

The fall controller 202 is able to appropriately change the fall direction of the robot in the presence of multiple surrounding objects, where the robot must try to avoid falling in several directions. Fall direction control can be formulated as a minimization problem, where the robot tries to minimize its deviation from a desired fall direction. The robot algorithmically determines the desired fall direction from the location of obstacles and the impending fall direction.

Figure 3:
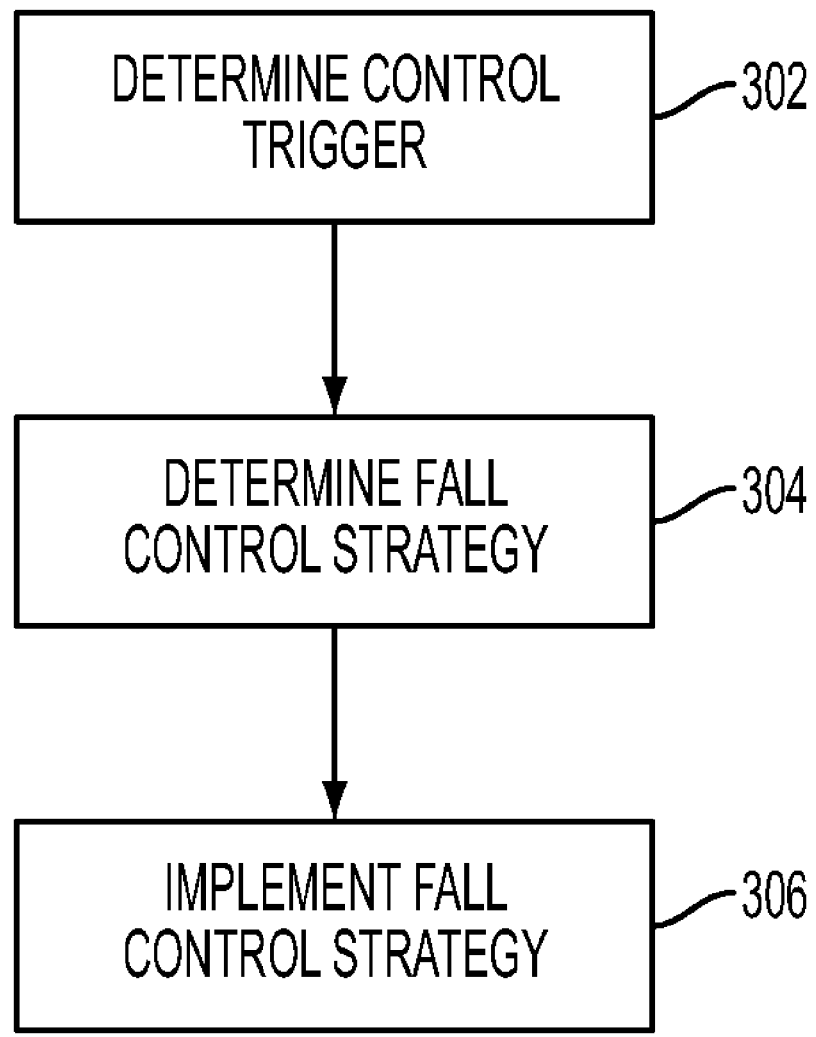
FIG. 3 is a flowchart illustrating a method for controlling a robot during a fall, in one embodiment.

FIG. 3 is a flowchart illustrating a method for controlling a robot during a fall, in one embodiment. Initially, the fall controller 202 determines 302 whether the control trigger has occurred (i.e., has been set). This determination may be made using information from the fall detector 204. The control trigger indicates that the fall has progressed to the point that effective fall control can occur. The fall controller then determines 304 a fall control strategy. This is also referred to as the planning phase. The fall controller then implements 306 the determined fall control strategy. This is also referred to as the control phase. The implementation includes providing actuator commands 210 to the actuators of the robot.

Figure 4:
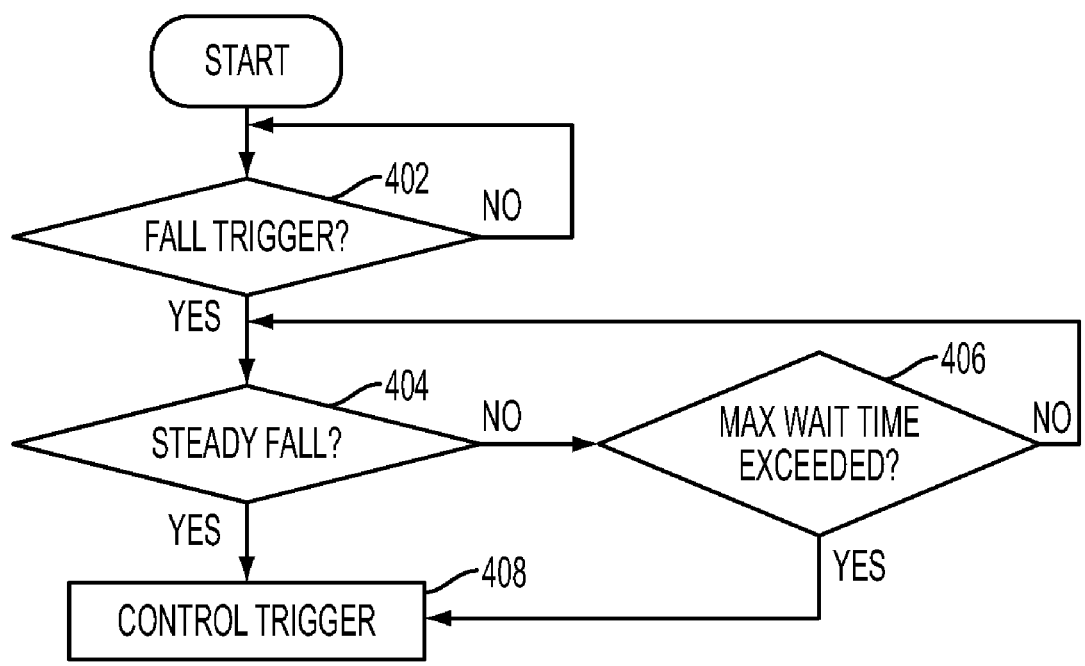
FIG. 4 is a flowchart illustrating a method for determining the control trigger, in one embodiment.

FIG. 4 is a flowchart illustrating a method for determining 302 the control trigger, in one embodiment. In step 402, the fall detector 204 determines that a fall is imminent by sending a fall trigger indication to the fall controller. The fall detector 204 may detect an exit through a Fall Trigger Boundary (FTB) that encloses a region in the robot's feature space in which a balance controller of the robot is able to stabilize the robot. The fall trigger represents an early warning of an impending fall of the robot. Although the fall detector 204 may predict the imminence of a fall very early, the fall controller 202 might not, at that point, have sufficient information to determine the appropriate fall control strategy.

For example, the fall controller assumes that the estimation of fall direction is accurate. This assumption holds only for a steady fall, where the initial and terminal fall directions coincide. For other cases where the fall direction evolves with time, this assumption may not hold. Therefore, in order to determine the best fall control strategy and implement the strategy, it should be determined that the tipping motion is steady. The control trigger is the instant, simultaneous or subsequent to the fall trigger, when the robot's tipping motion is ascertained to be steady.

In one embodiment, a capture point trajectory is used to evaluate the steadiness of the tipping motion. A capture point is a point on the ground 104 to which the robot 102, when subjected to a perturbation, can step to and stop without requiring another step. The capture point can be estimated using a linear inverted pendulum model of the robot and is directly proportional to the Center of Mass (CoM) velocity of the robot. The capture point module 212 determines the capture point of the robot at successive time intervals (e.g., every 10 milliseconds). The computation of capture points is further described in related to co-pending U.S. application Ser. No. 11/946,702.

Figure 5A:
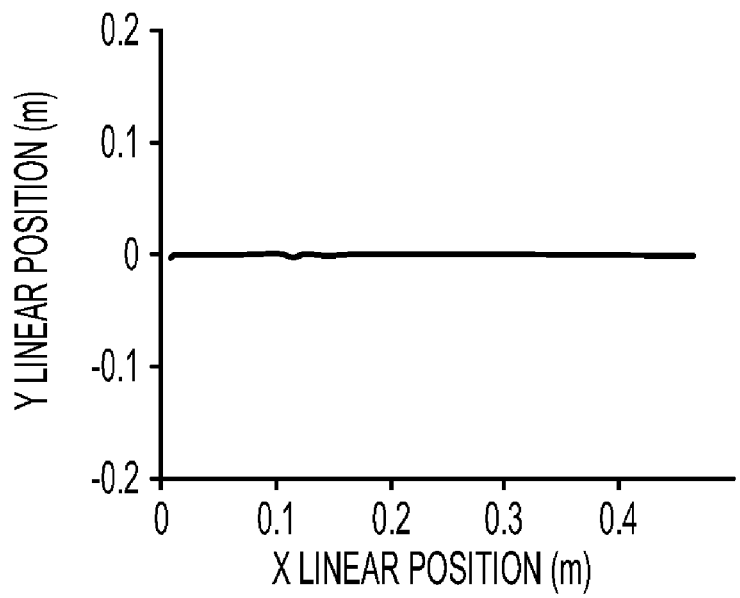
FIG. 5A illustrates a capture point trajectory that indicates a steady fall, in one embodiment.
Figure 5B:
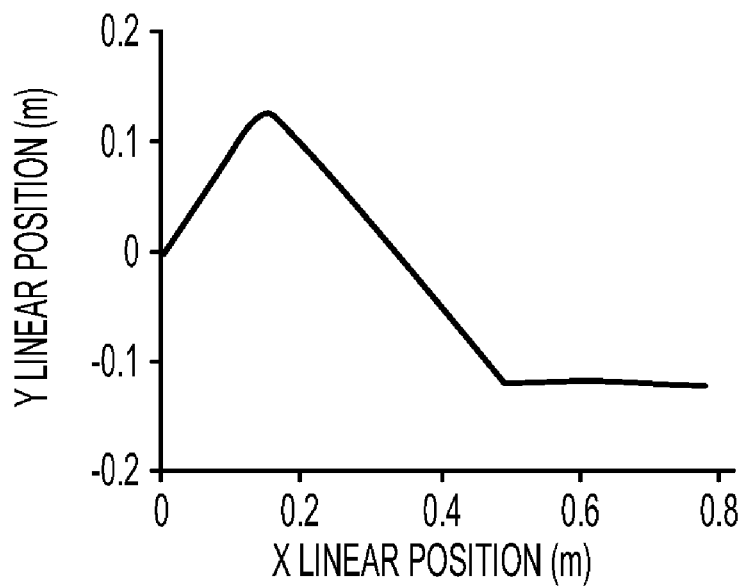
FIG. 5B illustrates a capture point trajectory that indicates spinning and/or tumbling motion, in one embodiment.

During steady fall, the capture point trajectory is approximately a straight line. But, when there is a spinning motion about an axis normal to the ground, the fall is no longer steady and the capture point trajectory changes direction. FIG. 5A illustrates a capture point trajectory that indicates a steady fall while FIG. 5B illustrates a capture point trajectory that indicates spinning and/or tumbling motion, in one embodiment. The trajectories in FIGS. 5A and 5B represent the motion of the capture point on the ground over time. The trajectory illustrated in FIG. 5A is approximately a straight line, while the trajectory illustrated in FIG. 5B is not initially a straight line. Once the trajectory in FIG. 5B reaches an X Linear Position of approximately 0.47 meters, the trajectory becomes approximately a straight line. The trajectory in FIG. 5B may indicate that the robot began falling in a spinning motion but then entered a steady fall in a particular direction.

Generally, the longer the fall controller 202 waits following the fall trigger, the better is the estimate of all quantities pertaining to the fall, since the fall has more likely become steady. However, the longer the fall controller waits also limits the time available to do anything useful to change the direction of fall. As a result, there is a trade-off between information and time.

At every instant, the control trigger module 214 evaluates the steadiness of a fall in step 404 by computing the collinearity of a set of past capture points ending at the current time. For example, it may take a moving average of the recent trajectory points and determine whether any points of the recent trajectories significantly deviate from the moving average. If steadiness is not reached within a time limit (e.g., 40 milliseconds), as shown in step 406, the control trigger is automatically set and the fall controller 202 is activated. The number of recent trajectory points considered, the allowable limits of collinearity, and the time limit can be tuned based on the observed performance of the robot.

As mentioned above, in step 304 of FIG. 3, the fall control strategy is determined. This strategy is determined based on scores associated with different possible directions of fall. As illustrated in FIGS. 1A and 1B, the robot 102 should attempt to fall in a direction in which it is least likely to hit a surrounding object 106. The direction scoring module 208 determines a score associated with each fall direction as described below.

Figure 6:
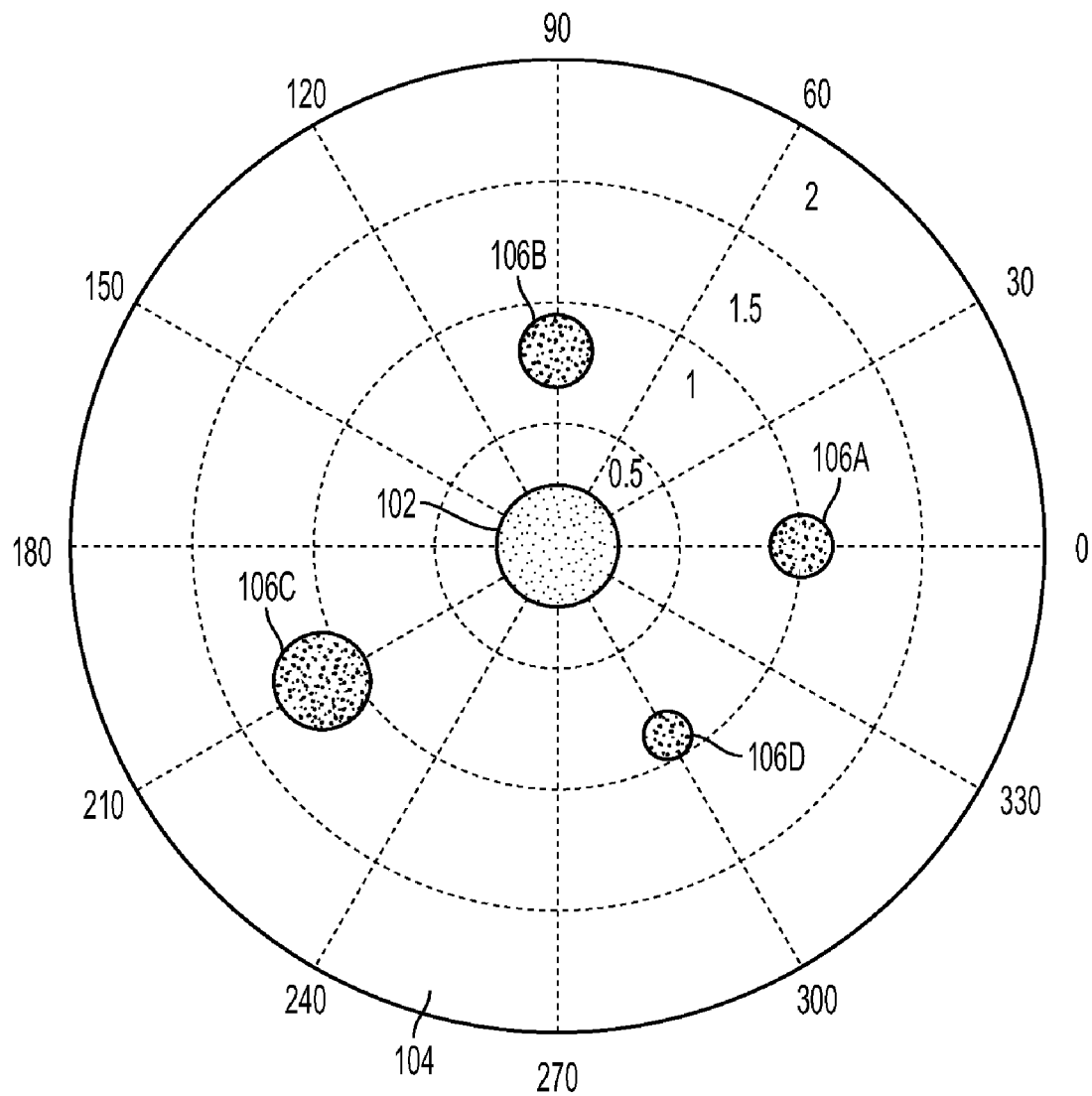
FIG. 6 illustrates a horizontal projection of the robot and surrounding objects on the ground, in one embodiment.

FIG. 6 illustrates a horizontal projection of the robot 102 and surrounding objects 106 on the ground 104, in one embodiment. The robot and surrounding objects are approximated by circumscribing vertical cylinders centered at their respective CoMs. On the horizontal projection, the objects are represented by circles and the robot is represented by a circle with its center at the CoM and the maximum leg spread as its diameter. Other values for the diameter can be chosen such as the maximum or typical arm span of the robot. The direction scoring module 208 is provided with the position and size of surrounding objects 106. This information may be determined from the sensor data 206, where the data originates from visual sensors on the robot 102 and is processed by various computer vision and/or object recognition algorithms.

Figure 7:
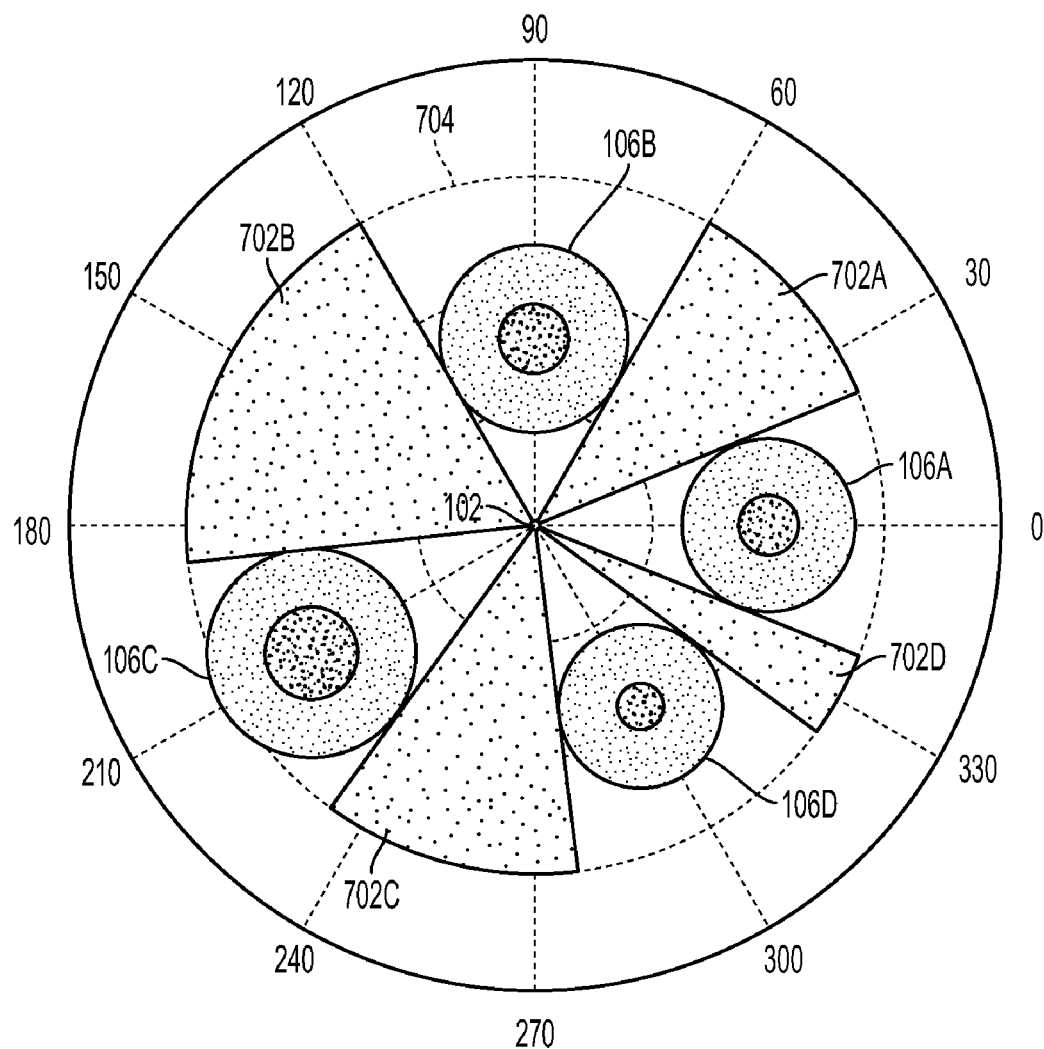
FIG. 7 illustrates a horizontal projection of the robot and surrounding objects with the robot shrunk to a point and the surrounding objects expanded, in one embodiment.

FIG. 7 illustrates a horizontal projection of the robot 102 and surrounding objects 106 with the robot shrunk to a point and the surrounding objects expanded, in one embodiment. Following the configuration space formulation used in traditional motion planning algorithms, the surrounding object circles are grown by the radius of the robot circle and the robot is reduced to a point. This configuration is used for the determination of safe fall regions by geometry. The planning process uses information in polar coordinates $(r,\theta)$ with the point robot at the origin $(0,0)$, where $r \in \Re^+$ represents the distance from the point robot and $\theta \in \Theta = [0, 2\pi]$ represents the direction. The direction $\theta = 0$ represents the reference direction with respect to which all objects' positions and orientations are known. In one embodiment, only surrounding objects within a radius of 1.5 times the height of the robot are considered for the planning process; the other objects are considered too far from the robot to be hit. This radius is represented by dotted line 704.

Figure 8:
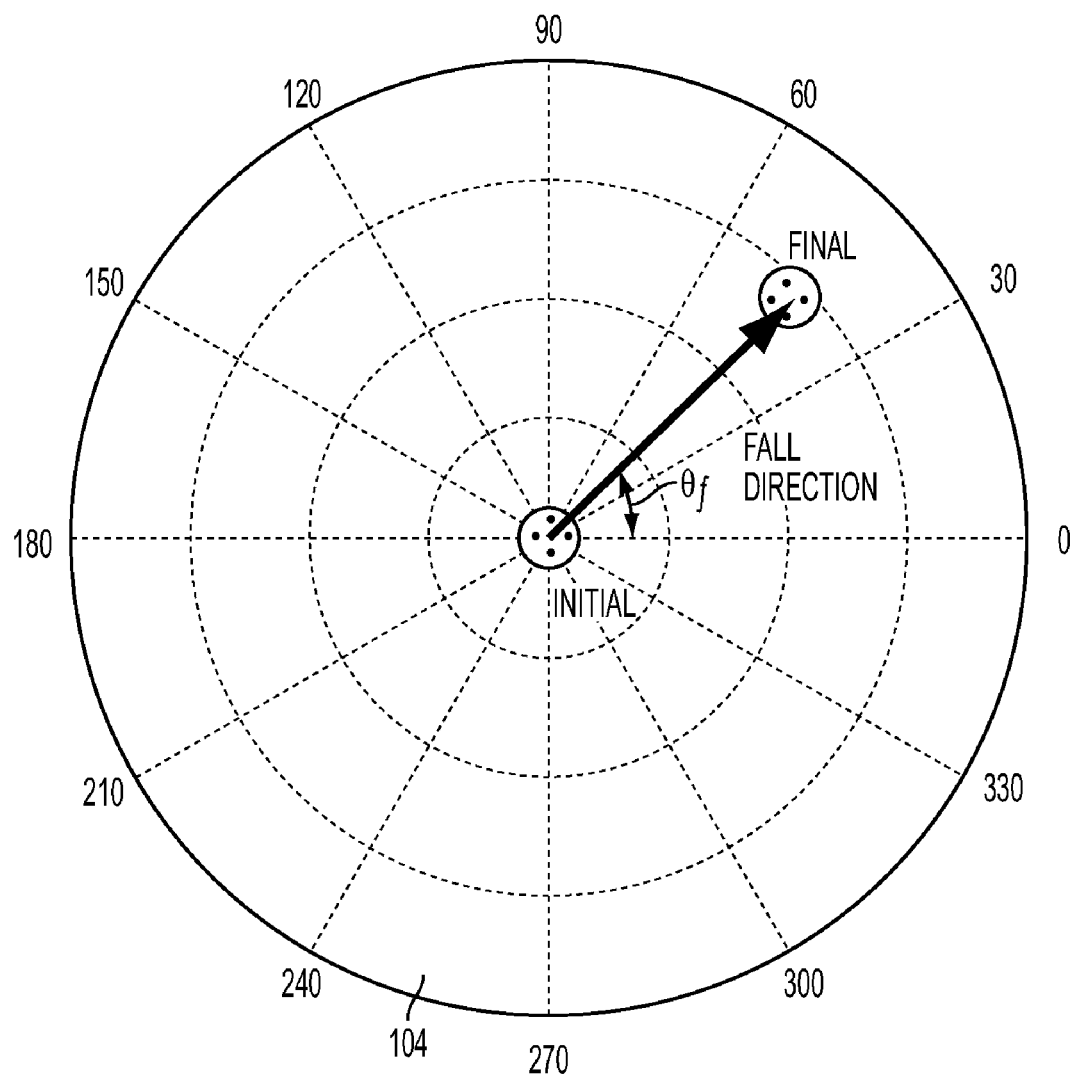
FIG. 8 illustrates a horizontal projection of the robot showing the fall direction of the robot, in one embodiment.

As mentioned above, the fall controller 202 influences the fall direction of the robot. The fall direction is defined as the vector connecting the robot's initial and final CoM ground projections. The initial state is at control trigger and the final state is the ground robot touchdown, estimated using inverted pendulum simulations. Other models besides the inverted pendulum model can also be used. At fall trigger, all controllers on the robot are assumed to be stopped and the joints are locked with the robot behaving like a rigid body until control trigger is reached. After control trigger is set by the control trigger module 214, the fall controller 303 becomes the active controller as mentioned above. The fall direction is independent of the intermediate configurations of the robot, which implies that it is independent of the CoM positions during fall. FIG. 8 illustrates a horizontal projection of the robot showing the fall direction of the robot, in one embodiment. The fall direction vector connects the initial and final CoM ground projections of the robot. The fall direction is given by the angle $\theta_f \in \Theta$.

A safe fall region, characterized by an object-free cone, is the set of continuous fall directions $(\theta_f)$ with no surrounding objects inside them. Safe fall regions 702A-D are illustrated in FIG. 7. The safe fall regions 702 represent the set of directions in which the robot can fall without hitting a surrounding object. The number of safe fall regions, $n_{sf}$, is given by:

$$n_{sf} = n_{obj} - n_{int} \quad (1)$$

where $n_{obj}$ is the number of non-intersecting objects and $n_{int}$ is the number of pairs of intersecting expanded objects. In the example of FIG. 7, $n_{sf}$ is 4, $n_{obj}$ is 4, and $n_{int}$ is 0. The set of all safe fall regions is given by $SF=\{SF_1, \ldots, SF_{n_{sf}}\}$, where $SF_j$ represents the $j^{th}$ safe fall region (free cone).

Having determined the safe fall regions, the direction scoring module 208 determines scores for each direction within the regions. Each fall direction $\theta_{f_i}$ receives two scores ($s_1^i, s_2^i$), whose weighted sum gives the total score $s^i$ as shown below:

$$s_1^i = \begin{cases} 1 - \frac{\Delta\theta_{f_j}}{\Delta\theta_{f_{max}}}, & \text{if } \theta_{f_i} \in SF_j \\ 1, & \text{if } \theta_{f_i} \notin SF \end{cases} \quad (2)$$

$$s_2^i = \begin{cases} \frac{2|\theta_{f_i} - \theta_{f_j}^b|}{\Delta\theta_{f_j}}, & \text{if } \theta_{f_i} \in SF_j \\ \frac{2|\theta_{f_i} - \theta_{f_{j*}}^b|}{\Delta\theta_{f_{j*}}}, & \text{if } \theta_{f_i} \notin SF \text{ and } \theta_{f_i} \to SF_{j*} \end{cases} \quad (3)$$

$$s^i = w_1 s_1^i + w_2 s_2^i, \quad w_1 + w_2 = 1 \quad (4)$$

where $\Delta\theta_{f_j}$ represents the angle subtended by the $j^{th}$ safe fall region $SF_j$, $\theta_{f_j}^b$ represents the absolute angle of the bisector of the $j^{th}$ safe fall region, $\Delta\theta_{f_{max}}$ represents the angle subtended by the largest safe fall region, and $\theta_{f_i} \to SF_j^*$ means that the $j^{th}$ safe fall region is the closest to $\theta_{f_i}$. It is to be noted that when $\theta_{f_i} \in SF$, then $s_1^i \in [0,1]$, $s_2^i \in [0,1]$, and $s^i \in [0,1]$. Also, when $\theta_{f_i} \notin SF$, then $s_1^i = 1$, $s_2^i > 1$, and $s^i > 1$. In other words, the safe fall directions receive a score less than or equal to one, whereas the unsafe fall directions receive a score greater than one. The total score $s^i$ is zero when the fall direction $\theta_i$ is at the bisector of the largest safe fall region. Therefore, the lower the score, the safer the fall direction.

A score can be determined for each fall direction $\theta_{f_i}$ within the safe fall regions 702 at a particular granularity (e.g., every 5° or 1°). The scores can be recalculated periodically (e.g., every 100 milliseconds) so that when the control trigger is set, a current set of scores are immediately available to the fall controller 202. The scoring algorithm discussed above generally favors larger safe fall regions over smaller ones (e.g., region 702B over region 702D). It also favors the bisector of a particular region over the edges of the region (e.g., 150° of 702B is favored over 180° of 702B). In one embodiment, the scoring algorithm may take into account the importance of different types of surrounding objects. For example, if 106C is a human while 106B is a piece of furniture, fall directions near 106B may be favored over fall directions near 106C. In this embodiment, the direction scoring module is provided with the type of each surrounding object, which may be determined from visual sensor data using a pattern matching algorithm, for example.

Figure 9:
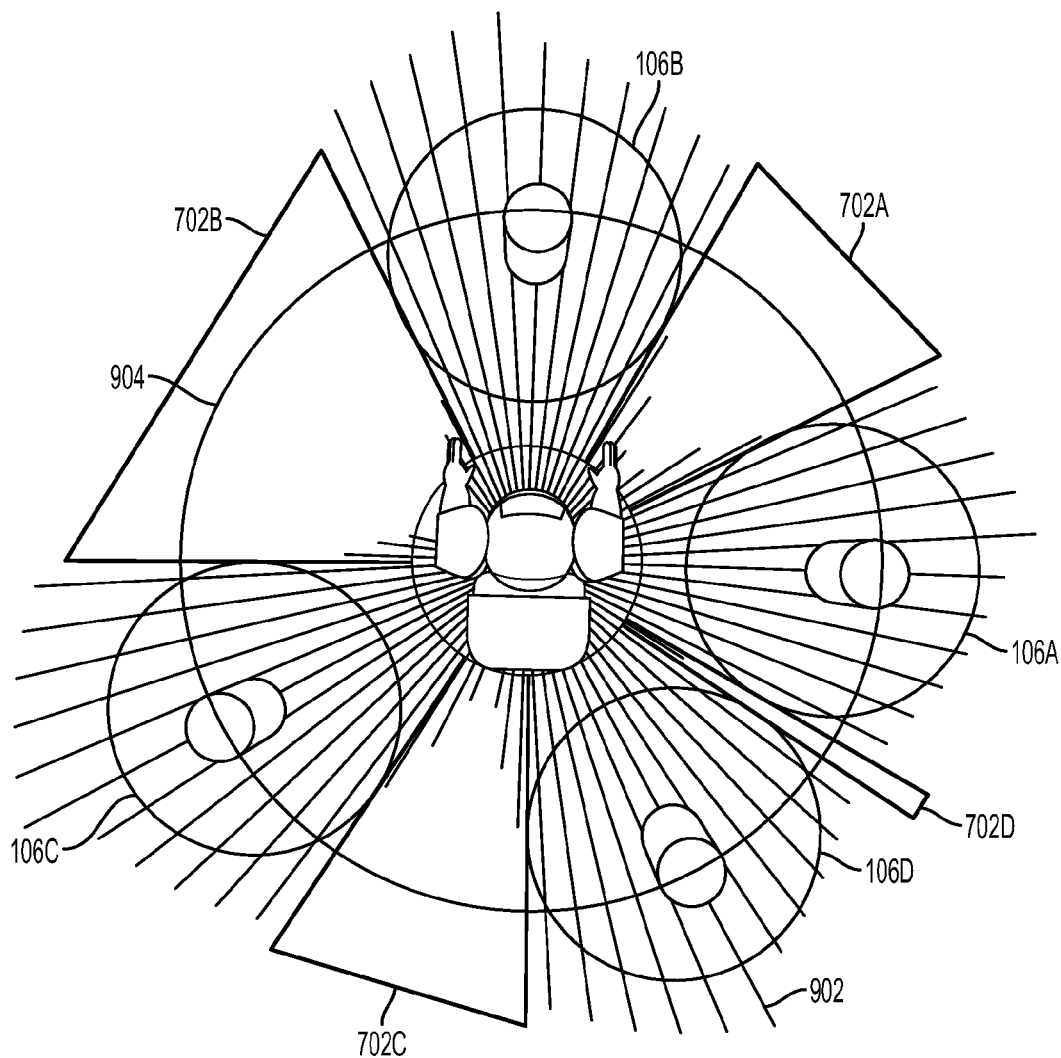
FIG. 9 illustrates scores corresponding to various fall directions of the robot, in one embodiment.

FIG. 9 illustrates scores corresponding to various fall directions of the robot 102, in one embodiment. The safe fall areas 702 correspond to fall directions that do not intersect with a surrounding object 106 after it has been expanded as discussed above. Each line 902 corresponds to a possible direction of fall and the length of the line is equal to the score determined by the direction scoring module 208. As mentioned above, a lower score indicates a more desirable direction of fall, so a shorter line in FIG. 9 also indicates a more desirable direction of fall. As can be seen, the directions of fall within safe fall areas 702 have significantly shorter lines than the lines outside of the safe fall areas. The unit circle 904 shows which scores are less than or equal to 1 (safe fall) and which scores are more than 1 (unsafe fall). The most desirable fall direction is near the bisector of the largest safe fall area (area 702B in FIG. 9).

Figure 10:
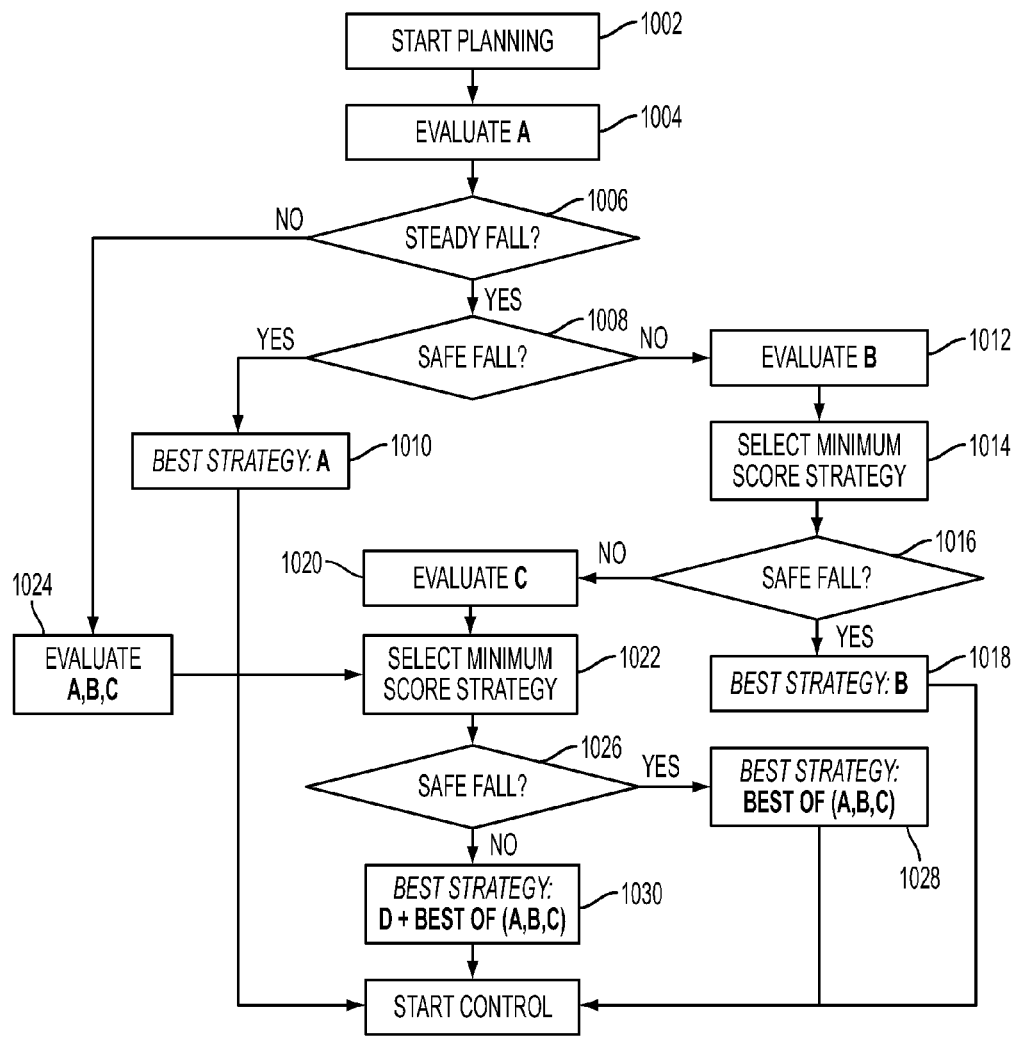
FIG. 10 is a flowchart illustrating a method for determining a fall control strategy, in one embodiment.

FIG. 10 is a flowchart illustrating a method for determining 304 a fall control strategy, in one embodiment. This method is also referred to as the planning phase of the fall controller and is carried out by the planning module 220. The planning module 220 evaluates and selects from three foot placement strategies: taking no action (strategy A in FIG. 10), lifting a leg (strategy B in FIG. 10), or taking a step (strategy C in FIG. 10).

In strategy A, taking no action, there is no attempt at controlling the robot beyond locking all joints and letting the robot fall down as a rigid body. This strategy is adopted when the default fall direction of the robot is already deemed safe.

Strategy B, lifting a leg, is evaluated only when the robot is in the double-support phase (i.e., both feet on the ground). It involves two possible sub-strategies: lift the left leg or lift the right leg. Lifting a leg reduces the extent of the support base to a single footprint. Although apparently simple, this strategy can exert significant influence on the toppling motion.

Strategy C involves taking a step from the robot's current position. The number of possible stepping locations provides a number of sub-strategies to be evaluated. In one embodiment, an inverted pendulum model is used to estimate the amount of time available before the robot touches the ground. This is used as the control duration for estimating the allowable stepping region with leg Jacobians as further described in U.S. application Ser. No. 12/610,865. An appropriately taken step changes the support base geometry the most and can exert a powerful nudge to the robot's fall direction. However, it also takes a relatively long time to complete the step, and if the robot is already undergoing tipping, there might not be enough time to complete the step. There are cases where the swing foot touches the ground before the step completion due to severe inclination of the robot.

The planning module 220 also considers inertia shaping strategies that are either used in conjunction with the foot placement strategies or as a replacement for the foot placement strategies. The strategies include whole body inertia shaping (strategy E in FIG. 11) and partial inertia shaping (strategy D in FIG. 10). Strategy E, whole body inertia shaping, involves employing inertia shaping techniques on the entire robot. This technique recruits all the joints and replaces the foot placement strategy when it fails to produce a safe fall. Strategy D, partial inertia shaping, involves using inertia shaping techniques only on those joints on the robot that are not involved in the stepping.

The planning module 220 selects from the above strategies at the control trigger. The primary objective is to fall in a safe fall region 702 and not necessarily to fall far away from the surrounding objects 106. In case of steady fall, the fall direction estimation is more accurate and the no action (strategy A) and lift a leg (strategy B) strategies are given preference over the take a step (strategy C) strategies because the former are guaranteed to be completed successfully. In case of unsteady fall or in case of steady fall where the no action (strategy A) and lift a leg (strategy B) strategies fail to produce a safe fall, all foot placement strategies are evaluated and their estimated fall directions are assigned scores. The one with the minimum total score is chosen to be the optimal safe fall direction and the strategy that produces it is the optimal strategy. Even when no foot placement strategy produces a safe fall direction, the algorithm chooses the strategy with the lowest score that corresponds to the fall direction closest to a safe fall region.

Initially, in step 1004 of FIG. 10, the no action (strategy A) case is considered. The score corresponding to the current fall direction is obtained from the direction scoring module and this score is associated with the no action strategy. In step 1006 it is determined whether the robot is in steady fall. This information can be obtained from the control trigger module 214. As mentioned above, it is possible that the control trigger is set even if the robot is not yet in steady fall (e.g., if the maximum wait time is reached). If the robot is in steady fall, then in step 1008 it is determined whether the robot is falling toward a safe fall region 702. If so, then the best strategy is deemed to be no action (strategy A) in step 1010.

If it is determined that the robot is not falling toward a safe region, then lifting a leg (strategy B) is evaluated in step 1012. Lifting a leg includes two possibilities (lifting the right or left leg) and each possibility is considered. The change in the support base of the robot resulting from lifting each leg is determined and the new predicted directions of fall are determined based on the modified support bases. The scores corresponding to each of these directions of fall are obtained from the scoring module in step 1012. In step 1014, the strategy (e.g., right or left leg) with the minimum score is selected. In step 1016, it is determined whether this selected strategy results in a fall direction to a safe fall region. If so, then strategy B (lifting the right or left leg) is chosen as the best strategy in step 1018.

If neither strategies A nor B are producing safe falls, strategy C is considered in step 1020. Strategy C involves taking a step with a leg. If the robot is in the double support phase, a step may be taken by either leg. If the robot is in the single support phase, a step may be taken by the leg not in contact with the ground. The leg taking a step is referred to here as the swing leg. Various stepping locations are considered for one or both legs. As mentioned above, the control duration is used for estimating the allowable stepping region with leg Jacobians. For a set of stepping locations within the allowable stepping region, the expected changes to the support base and resulting new fall directions of the robot are determined. The scores for each of these new fall directions are determined from the direction scoring module and the minimum score is selected in step 1022. Step 1022 also considers the scores from strategies A and B determined earlier when calculating the minimum.

If a determination was made in step 1006 that the robot was not in a steady fall, strategies A, B, and C are evaluated in step 1024. In an unsteady fall, it is not clear which direction the robot will fall with no action (strategy A) or with merely lifting a leg (strategy B), so less preference is given to those strategies. Scores are determined for all strategies A, B, and C, including the various sub-strategies. The strategy with the minimum score is selected in step 1022 as with the steady fall case described above.

In step 1026, it is determined whether the minimum score from step 1022 occurs in a safe fall region. If so, then the strategy corresponding to the minimum score is chosen in step 1028 as the best strategy. If not, the foot placement strategy corresponding to the minimum score is combined with partial inertia shaping (strategy D) in step 1030. This combined strategy is deemed the best strategy. The use of partial inertia shaping may affect the fall direction enough to result in a fall in a safe fall region or at least closer to a safe fall region. The bisector of the safe fall region 702 closest to the direction corresponding to the optimal foot placement strategy is chosen to be the desired direction for the partial inertia shaping procedure. This fall direction corresponds to the local minima closest to the current fall direction. While the optimal foot placement strategy tries to do the best it can, partial inertia shaping tries to move the body to the closest safe fall region 702. Since partial inertia shaping does not involve the joints needed for foot placement, it can be performed simultaneously with the foot placement strategy.

Figure 11:
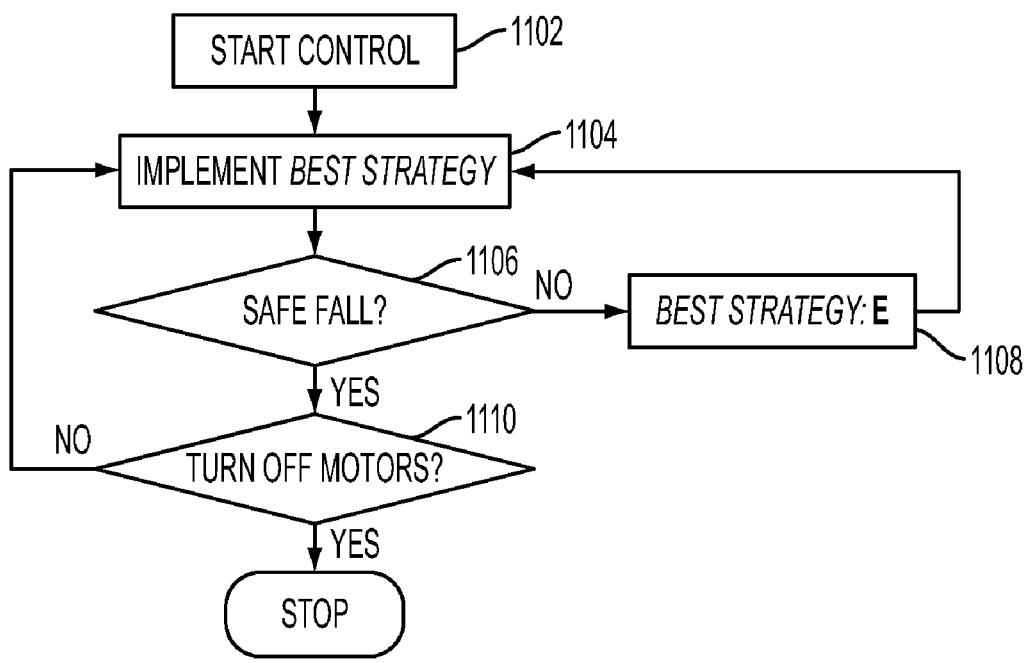
FIG. 11 is a flowchart illustrating the implementation of the fall control strategy, in one embodiment.

FIG. 11 is a flowchart illustrating the implementation of the fall control strategy, in one embodiment. Once the best strategy has been determined as illustrated in FIG. 10, the implementation or control phase begins in step 1102. The fall controller implements, or executes, the strategy in an interactive manner such that real-time modifications can be made in case there is a risk of failure. In step 1104, the best strategy is implemented. This may involve no action, lifting one leg, taking a step, and/or performing partial inertia shaping as discussed above.

The stepping module 216 implements the strategy of taking a step (strategy C). The planning module 220 provides a desired stepping location, and the stepping module 216 achieves stepping to the location by controlling the leg joint angles through inverse kinematics. However, precise stepping is not trivial in the case of a tipping robot. The robot behaves as an under-actuated system and given only the joint angles, the robot does not know that it is tipping. One way the robot could know this is with the use of other sensors like a gyroscope. In one embodiment, the robot has a 3-axis gyroscope and 3-axis accelerometer, which can provide the information needed to compute the base frame's tipping transformation. The base frame is attached to the centroid of the trunk. The controller uses Jacobians to control the stepping motion. The necessary joint velocities a to move the swing leg to the desired location is given by:

$$\dot{\theta} = J_R^{L\#}(\dot{P}_R - \dot{P}_L) \quad (5)$$

where $J_R^{L\#}$ is the pseudo-inverse of foot-to-foot Jacobian $J_R^L$, $\dot{P}_R$ and $\dot{P}_L$ are the linear velocities of the right and left feet respectively.

The inertia shaping module 218 implements partial inertia shaping (strategy D) and whole body inertia shaping (strategy E). If partial inertia shaping is chosen as part of the best strategy (e.g., as in step 930), then it is implemented in step 1104. If the implementation of the best strategy in step 1104 still does not result in a safe fall in step 1106, then whole body inertia shaping is implemented in step 1108. At any time after implementation of the best strategy, if the robot's fall direction is unsafe, whole body inertia shaping is initiated. The bisector of the safe fall region closest to the current fall direction is chosen to be the desired direction of fall and the inertia shaping procedure tries to achieve it. In step 1110, if the robot's inclination angle exceeds a maximum threshold, all the motors are turned off, i.e., all joints are unlocked, in order to reduce damage due to impact.

Inertia shaping changes the fall direction by generating an angular momentum in the desired direction of fall. In inertia shaping, the composite rigid body (CRB) inertia of the robot is controlled. The inertia shaping control described below is used to move the robot in a desired direction. Other approaches, such as those described in U.S. application Ser. No. 12/610,872, aim to move the robot away from a direction to be avoided. The desired direction of fall is determined as described above. The inertia matrix, $I_d$, can be derived from this desired direction and from the state of the robot (e.g., joint angle velocities). Further details of deriving the desired inertia matrix $I_d$ can be found in U.S. application Ser. No. 12/610,872.

Figure 12:
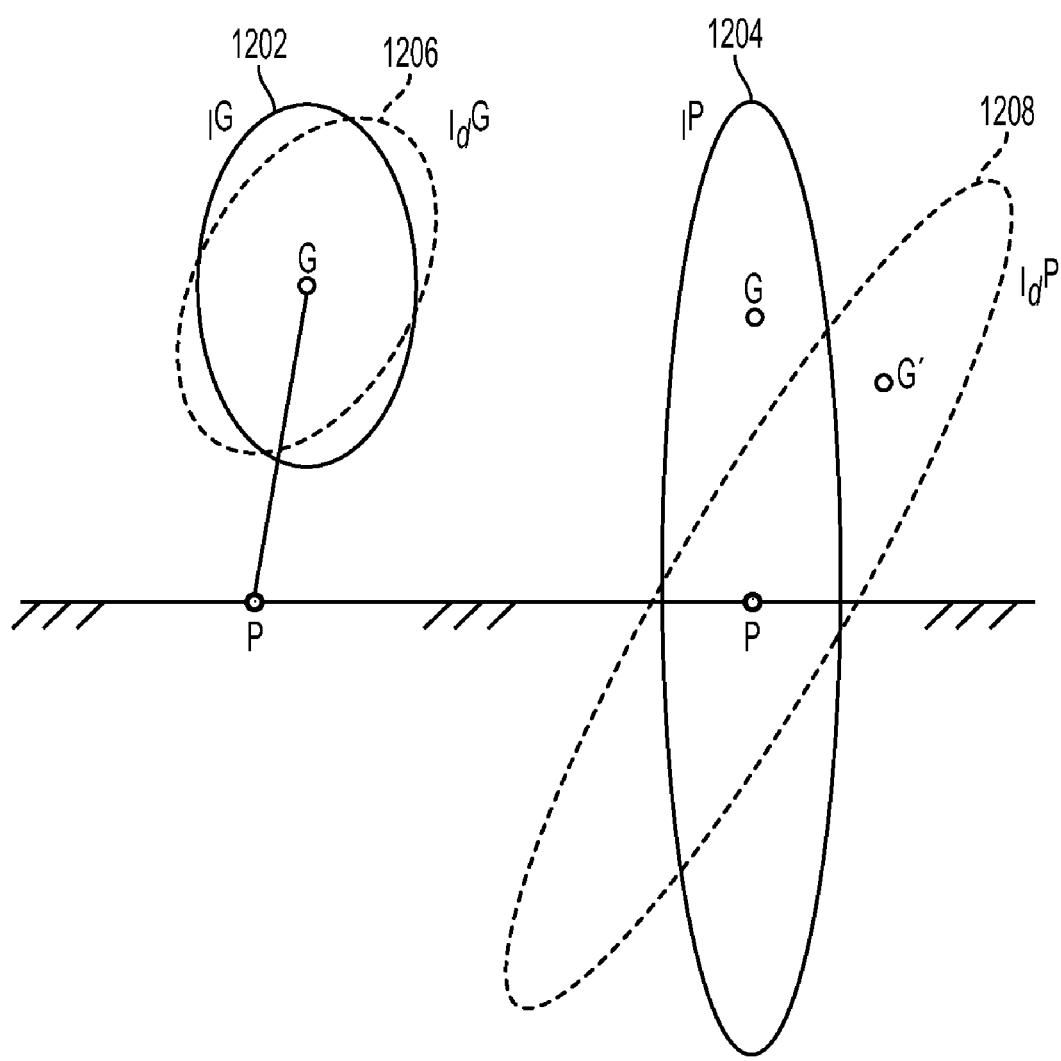
FIG. 12 illustrates inertia shaping about the Center of Mass (CoM) and inertia shaping about the Center of Pressure (CoP), in one embodiment.

Inertia shaping can be done for the inertia about the CoP ($I^P$) or for the inertia about the CoM ($I^G$) of the robot. FIG. 12 illustrates inertia shaping about the CoM and inertia shaping about the CoP, in one embodiment. Ellipsoids 1202 and 1204 represent the current inertia of the robot. Ellipsoids 1206 and 1208 represent the desired inertia of the robot. G represents the CoM while P represents the CoP. The desired inertia $I_d^G$, shown as 1206, is achieved from $I^G$, shown as 1202 using the CoM as the frame of reference, while the desired inertia $I_d^P$, shown as 1208, is achieved from $I^P$, shown as 1204, using the CoP as the frame of reference. As can be seen, using the CoP as the frame of reference allows the CoM to change (from G to G'), while using the CoM as the frame of reference does not.

The desired angular velocity used to derive the desired inertia is about the CoP frame and therefore the inertia shaping procedure is more effective if it is done about the same frame. Also, partial inertia shaping is more effective about the CoP. This is because the arm configurations make more significant contributions to the CRB inertia about the CoP. So, the desired inertia matrix $I_d$ derived here is about the CoP, i.e., $I_d^P$.

To implement inertia shaping, the 6 unique elements of the CRB inertia matrix are strung out in the form of a vector: $I_{(3\times 3)} \to \hat{I}_{(6\times 1)}$. Next, the CRB inertia Jacobian $J_I$ is determined. $J_I$ maps changes in the robot joint angles into corresponding changes in $\hat{I}$, i.e., $\delta \hat{I} = J_I \delta\theta$. The desired joint velocities to attain $\hat{I}_d$ are given by:

$$\dot{\theta} = J_I^{\#}(\hat{I}_d - \hat{I}) \quad (6)$$

where $J_I^{\#}$ is the pseudo-inverse of $J_I$.

Equation 6 is used for whole body inertia shaping. During partial inertia shaping, some joints may not be engaged. In one embodiment, only those joints that are free from the foot placement strategy implementation are controlled in partial inertia shaping so that the foot placement is not jeopardized. The free joints include the upper body joints of the robot, and for the strategy of lifting a leg, they additionally include the stance leg joints. The CRB inertia Jacobian $J_I$ can be re-written as:

$$J_I = [J_{PIS} J_{FP}] \quad (7)$$

where $J_{PIS}$ is the CRB inertia Jacobian corresponding to the joints that are free from foot placement strategy execution, whereas $J_{FP}$ is the CRB inertia Jacobian corresponding to the joints involved in foot placement strategy execution. The desired angular velocities to attain $\hat{I}_d$ by partial inertia shaping are given by:

$$\dot{\theta}_{PIS} = J_{PIS}^{\#}(\hat{I}_d - \hat{I} - J_{FP}\dot{\theta}_{FP}) \quad (8)$$

where $J_{PIS}^{\#}$ is the pseudo-inverse of $J_{PIS}$ and $\dot{\theta}_{FP}$ is given by the controller for the optimal foot placement strategy.

Although the invention has been described in considerable detail with reference to certain embodiments thereof, other embodiments are possible as will be understood to those skilled in the art.

What is claimed is:

1. A method for controlling a robot having at least two legs, the robot falling down from an upright posture and the robot located near a plurality of surrounding objects, the method comprising:
   determining a plurality of predicted fall directions of the robot, each predicted fall direction associated with a foot placement strategy for avoiding the plurality of surrounding objects;
   determining a degree to which each predicted fall direction avoids the plurality of surrounding objects;
   selecting a best strategy from the plurality of foot placement strategies, the selecting based on the degree to which each predicted fall direction avoids the plurality of surrounding objects; and
   controlling the robot to implement the best strategy.

2. The method of claim 1, wherein the best strategy comprises taking a step.

3. The method of claim 1, wherein the best strategy comprises lifting a leg.

4. The method of claim 1, further comprising, prior to determining a plurality of predicted fall directions:
   determining whether the robot is steadily falling in a direction.

5. The method of claim 4, wherein determining whether the robot is steadily falling in a direction comprises:
   computing a collinearity of a set of capture point trajectories of the robot over time.

6. The method of claim 1, wherein the plurality of predicted fall directions are determined using an inverted pendulum model of the robot.

7. The method of claim 1, wherein determining a plurality of predicted fall directions of the robot comprises:
   determining a modified support polygon resulting from each foot placement strategy.

8. The method of claim 1, further comprising:
   incorporating partial inertia shaping into the best strategy, wherein a center of pressure of the robot is used as a frame of reference for the partial inertia shaping.

9. The method of claim 1, wherein controlling the robot to implement the best strategy comprises:
   controlling the robot to implement whole body inertia shaping.

10. A system for controlling a robot having at least two legs, the robot falling down from an upright posture and the robot located near a plurality of surrounding objects, the system comprising:
    a non-transitory computer-readable storage medium storing executable computer program modules configured for:
      determining a plurality of predicted fall directions of the robot, each predicted fall direction associated with a foot placement strategy for avoiding the plurality of surrounding objects;
      determining a degree to which each predicted fall direction avoids the plurality of surrounding objects;
      selecting a best strategy from the plurality of foot placement strategies, the selecting based on the degree to which each predicted fall direction avoids the plurality of surrounding objects; and
      controlling the robot to implement the best strategy.

11. The system of claim 10, wherein the best strategy comprises taking a step.

12. The system of claim 10, wherein the best strategy comprises lifting a leg.

13. The system of claim 10, wherein the modules are further configured for, prior to determining a plurality of predicted fall directions:
    determining whether the robot is steadily falling in a direction.

14. The system of claim 13, wherein determining whether the robot is steadily falling in a direction comprises:
    computing a collinearity of a set of capture point trajectories of the robot over time.

15. The system of claim 10, wherein the plurality of predicted fall directions are determined using an inverted pendulum model of the robot.

16. The system of claim 10, wherein determining a plurality of predicted fall directions of the robot comprises:
    determining a modified support polygon resulting from each foot placement strategy.

17. The system of claim 10, wherein the modules are further configured for:

incorporating partial inertia shaping into the best strategy, wherein a center of pressure of the robot is used as a frame of reference for the partial inertia shaping.

18. The system of claim 10, wherein controlling the robot to implement the best strategy comprises:

controlling the robot to implement whole body inertia shaping.

* * * * *

UNITED STATES PATENT AND TRADEMARK OFFICE
CERTIFICATE OF CORRECTION

PATENT NO. : 8,369,991 B2  
APPLICATION NO. : 12/641163  
DATED : February 5, 2013  
INVENTOR(S) : Ambarish Goswami et al.

Page 1 of 1

It is certified that error appears in the above-identified patent and that said Letters Patent is hereby corrected as shown below:

Title Page, Related U.S. Application Data (63), line 2, after "Nov. 2, 2009," insert --now Pat. No. 8,332,068,--.

Title Page, Related U.S. Application Data (63), line 3, after "Nov. 2, 2009," insert --now Pat. No. 8,352,077.--.

Signed and Sealed this
Thirtieth Day of July, 2013

Teresa Stanek Rea
*Acting Director of the United States Patent and Trademark Office*